Feb. 4, 1930.                W. H. CROFTON                1,745,356
                              CURRENT MOTOR
                           Filed July 7, 1928          2 Sheets-Sheet 1
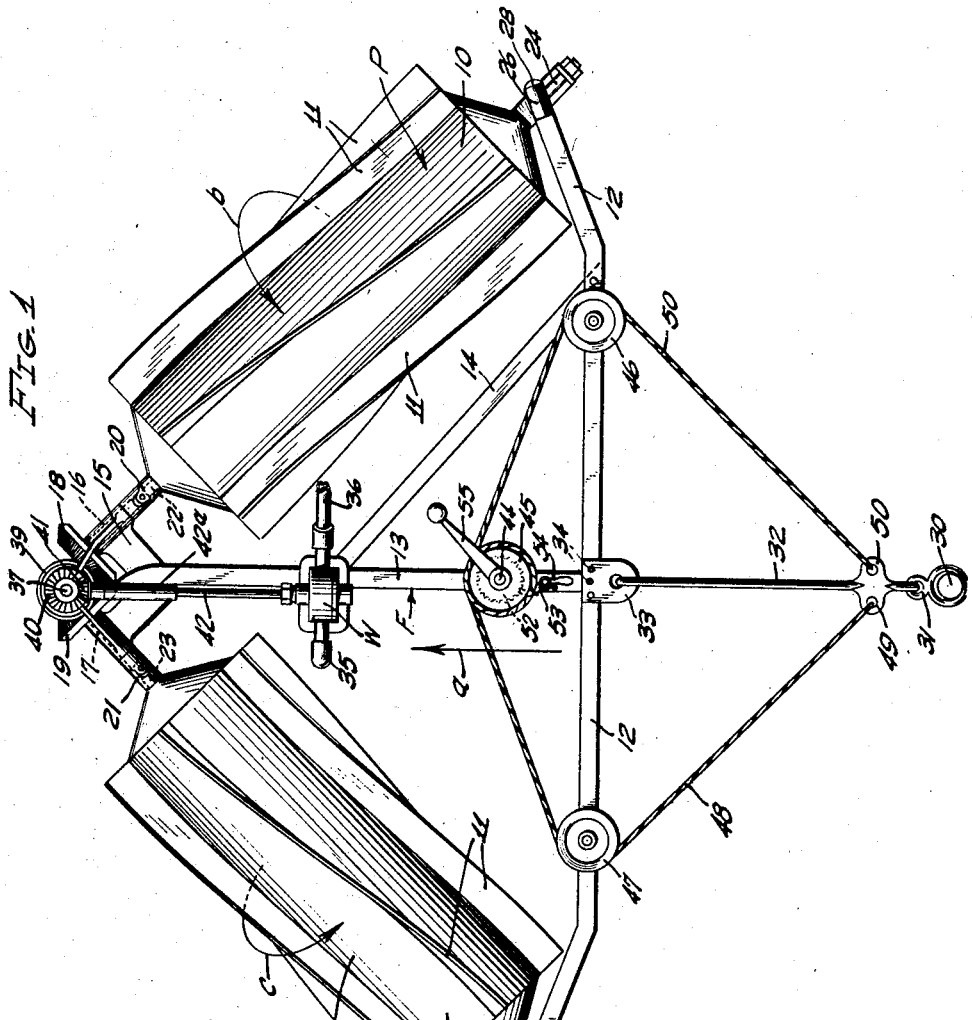
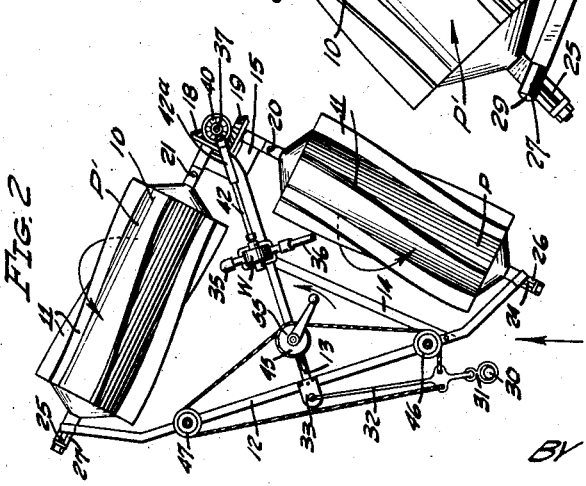
INVENTOR
WILLIAM. H. CROFTON
BY Munn & Co.
ATTORNEYS Feb. 4, 1930.                W. H. CROFTON                1,745,356
                              CURRENT MOTOR
                           Filed July 7, 1928            2 Sheets-Sheet 2
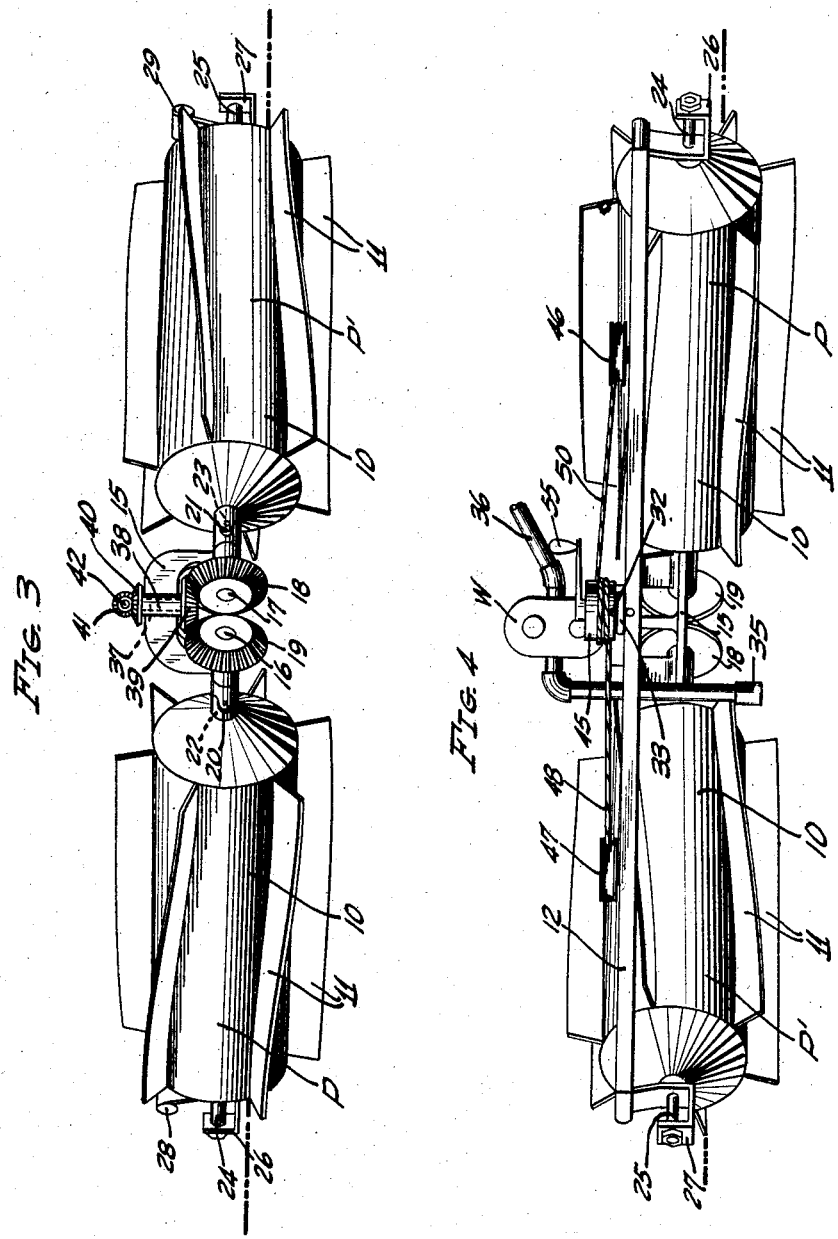
INVENTOR
WILLIAM H. CROFTON
BY Munn & Co.
ATTORNEYS Patented Feb. 4, 1930

1,745,356

UNITED STATES PATENT OFFICE

WILLIAM H. CROFTON, OF SAN DIEGO, CALIFORNIA

CURRENT MOTOR

Application filed July 7, 1928. Serial No. 291,046.

My invention relates to and has for a purpose the provision of a current motor particularly adapted, although not necessarily, for use in bodies of flowing water such as rivers and streams, and by which the force or power of the flowing water can be efficiently and economically utilized to perform useful work.

It is a further purpose of my invention to provide a current motor of simple and substantial construction, and which is capable of being adjusted with respect to the direction of water flow to occupy an active or working position wherein it will be operated by the water and to occupy an inactive position wherein the water will be ineffective to operate the motor, so that the operation of the motor can be discontinued at will and without necessitating removal of the motor from the water.

I will describe only one form of current motor embodying my invention, and will then point out the novel features in claims.

In the accompanying drawings,

Fig. 1 is a view showing in plan one form of current motor embodying my invention, and illustrating the active or working position of the motor;

Fig. 2 is a view similar to Fig. 1 on a reduced scale, and illustrating the inactive position occupied by the motor wherein the water is ineffective to operate it;

Fig. 3 is a view in elevation, of one end of the motor; and

Fig. 4 is a view in elevation of the opposite end of the motor.

Referring specifically to the drawings in which similar reference characters designate similar parts in each of the several views, my invention in its present embodiment comprises a pair of impellers P and P' of identical construction and in the present instance each being in the form of a hollow and watertight cylinder 10 of metal so as to be rendered buoyant, and having a plurality of spirally arranged ribs or vanes 11 co-extensive in length therewith, the vanes of one impeller being spiraled oppositely to those of the other impeller as clearly shown in Fig. 1.

The impellers are adapted to be mounted for rotary movement in a frame designated generally at F so as to support the latter in a body of water, and in the present instance the frame comprises a transverse member 12 and a longitudinal member 13 secured at one end to the transverse member substantially medially between the ends of the latter, and braced by means of a diagonal member 14. To the free end of the longitudinal member 13 is secured a V shaped bracket 15 in which are rotatably mounted at approximately right angles to each other, stub shafts 16 and 17 having fixed to their converging ends, bevel gears 18 and 19 respectively, constantly meshing with each other.

To the opposite end of the shafts 16 and 17 is fixed one of the two members of universal joints 20 and 21, the other member of the universal joints being fixed to trunnions 22 and 23 respectively, projecting axially from one end of the impellers P and P' respectively.

Other trunnions 24 and 25 project axially from the opposite ends of the impellers P and P' respectively and are rotatably mounted in hangers 26 and 27 respectively, pivoted on studs 28 and 29 respectively, projecting from the ends of the transverse member 12, to the end that the impellers will be rotatably mounted in the frame in diverging and substantially right angular relation to each other and yet are capable of a limited lateral movement independent of each other in response to wave action so as to prevent excessive stresses upon, and possible damage to the motor.

The frame F is adapted to be anchored in a stream, river, or other body of flowing water, and to this end a post 30 is driven or otherwise secured in the bed of the body of water and is provided with an eye 31 receiving one hooked end of a link 32, the other hooked end of the link engaging an eye formed in a plate 33 secured by fastening members 34 to the transverse and longitudinal members 12 and 13 at the junction of the two. It will thus be clear that with the frame F anchored to the post 30 and assuming that the current in the body of water is traveling in the direction of the arrow $a$ (Fig. 1), that the flowing water impinging against the vanes 11 at the confronting sides of the impellers P and P' will cause the latter to rotate in opposite directions as shown by the arrows $b$ and $c$ in this figure.

In order to utilize the rotary motion of the impellers P and P' to perform useful work; a power transferring mechanism is provided by which a water pump W is adapted to be driven, the pump being secured to the longitudinal member 13 of the frame F, and having its intake side connected to a section of pipe 35, the lower end of which is submerged in the body of water in which the motor is situated. The discharge side of the pump W is connected to a length of flexible hose 36 adapted to extend to a suitable storage tank on shore (not shown).

The power transferring mechanism for driving the pump from the impellers comprises, in the present instance, an upright shaft 37 journaled in a bearing 38 formed on the bracket 15, and having at its lower end a bevel gear 39 meshing with the bevel gear 18, while to the upper end of the shaft 37 is fixed a second bevel gear 40 constantly meshing with a bevel pinion 41 fixed to the pump shaft 42 which is extended from the pump for this purpose and is journaled in a bearing 42$^a$ secured to the bracket 15. It will thus be clear that when the impellers are driven as a result of the action of the water impinging thereagainst the pump W will also be driven through the medium of the power transferring mechanism to elevate water and pump it to a remote point.

In order to prevent rocking movement of the frame F in a horizontal plane about the post 30 so that the motor will at all times be maintained in the active or working position relative to the direction of water flow as illustrated in Fig. 1, and yet permit the frame to be swung horizontally to the inactive position shown in Fig. 2, as well as to be securely locked against accidental displacement from either position, the following means is provided in the present instance.

Rotatably mounted at 43 on the longitudinal member 13 of the frame F, is a shaft 44 to which is fixed a drum 45; and rotatably mounted on the transverse member 12 at opposite sides of the longitudinal member 13 are pulleys 46 and 47. A cable 48 is secured to an eye 49 on the link 32 and is trained about the pulley 46 and then wound about the drum 45 in a clockwise direction, while a second cable 50 is secured to a second eye 51 on the link 32 and is trained about the pulley 47 and then wound upon the drum 45 in a counter-clockwise direction.

Also fixed to the shaft 44 alongside and above the drum 45 is a toothed wheel 52, the teeth of which are normally engaged by a spring pressed pawl 53 to lock the wheel and hence the drum against rotation in either direction.

To permit disengagement of the pawl from the teeth of the wheel 52 the pawl is extended to provide a handle 54, while to provide means by which the shaft 44 can be manually rotated a crank 55 is fixed to the shaft.

With the motor occupying its active or working position shown in Fig. 1, and the shaft 44 locked against rotation by the pawl 53, it will be clear that the opposed cables 48 and 50 will act as braces and will co-operate to maintain the motor in its active position in which the impellers P and P' are disposed at equal angles to the direction of water flow so that the force of the water will act equally upon the impellers to rotate them in opposed directions as indicated by the arrows $b$ and $c$ in Fig. 1, to thus drive the pump W.

When it is desired to discontinue the operation of the motor, the pawl 53 is disengaged from the wheel 52, and by now rotating the crank 55 in a counter-clockwise direction as indicated by the arrow in Fig. 2, the cable 50 will wind upon the drum 45 while the cable 48 will unwind from the drum. The pull exerted upon the cable 50 incident to the winding thereof on the drum and the fact that the length of the cable is thus shortened between the drum and point of attachment of the cable to the link 32, causes the frame F to swing bodily from the position shown in Fig. 1 to that shown in Fig. 2. Upon again engaging the pawl 53 with the wheel 52, it will be clear that the motor will be locked in this position and as the angle of the impellers P and P' to the direction of flow of the water is such that the water will impinge against the vanes 11 at the same sides of the impellers and thus tend to rotate the latter in one and the same direction, the opposing turning moments exerted upon the gears 18 and 19 at their points of mesh, will cause them to lock, thus positively preventing rotation of the impellers, and hence operation of the pump W.

From the foregoing description it will be manifest that broadly my invention contemplates the provision of one or more impellers, preferably buoyant so as to support the motor in a body of water, and which are so anchored in the water as to respond to the action of the latter in utilizing the power or force thereof in performing useful work, and that further my invention contemplates the use of a suitable means by which the motor can be maintained in active or working position and yet can be adjusted to occupy an inactive position wherein the force of water will be ineffective to operate the motor, so that the operation of the motor can be discontinued at will, and without the necessity of the motor's removal from the water or by the provision of any extraneous means.

Although I have herein shown and described only one form of current motor embodying my invention, it is to be understood

I claim:

1. A current motor comprising a pair of cylindrical floats having oppositely spiraled vanes thereon, a rigid frame in which the floats are mounted for rotary movement with the axis of rotation of one float at an angle to the axis of rotation of the other float so that the floats will at all times be disposed in a predetermined diverging relation, means for anchoring the frame in a body of water to dispose the floats at an angle to the direction of water flow so that the force of the flowing water will act against the spiral vanes of the floats to rotate the latter in opposed directions, a driving connection between the floats, and power transferring means operatively connected to the driving connection.

2. A current motor comprising a pair of cylindrical floats having oppositely spiraled vanes thereon, a frame in which the floats are mounted for rotary movement with the axis of rotation of one float at an angle to the axis of rotation of the other float so that the floats will be disposed in diverging relation, means for anchoring the frame in a body of water to dispose the floats at an angle to the direction of water flow so that the force of the flowing water will act against the spiral vanes of the floats to rotate the latter in opposed directions, a driving connection between the floats, power transferring means operatively connected to the driving connection, and means by which the frame can be adjusted relative to the anchoring means to so position the floats relative to the direction of water flow that the water will tend to rotate the floats in such directions as to cause said driving connection to lock and thereby prevent rotation of the floats, and means for locking the frame in adjusted position.

3. A current motor comprising a pair of cylindrical floats having oppositely spiraled vanes thereon, a frame in which the floats are mounted for rotary movement with the axis of rotation of one float at an angle to the axis of rotation of the other float so that the floats will be disposed in diverging relation, a driving connection between the floats by which rotation of one float in one direction can only rotate the other float in the opposite direction, means for anchoring the frame in a body of water, means by which the frame can be adjusted relative to the direction of flow of the water to occupy one position wherein the force of the flowing water will act against the spiral vanes of the floats to rotate the latter in opposed directions, and another position wherein the floats will be so disposed relative to the direction of water flow that the water in acting against the float vanes will tend to rotate the floats in the same direcion, whereby said driving connection will lock and thereby prevent rotation of the floats, and means for securing the frame in either position.

4. A current motor comprising a pair of cylindrical floats having oppositely spiraled vanes thereon, a frame in which the floats are mounted for rotary movement with the axis of rotation of one float at an angle to the axis of rotation of the other float so that the floats will be disposed in diverging relation, a pair of meshing bevel gears, one for each of the floats and fixed to the axes thereof, by which rotation of one float in one direction will tend to rotate the other float in the opposite direction, means for anchoring the frame in a body of water, means by which the frame can be adjusted relative to the direction of flow of the water to occupy one position wherein the force of the flowing water will act against the spiral vanes of the floats to rotate the latter in opposed directions, and another position wherein the floats will be so disposed relative to the direction of water flow that the water in acting against the float vanes will tend to rotate the floats in the same direction whereby said gears will lock and thereby prevent rotation of the floats.

5. A current motor comprising a pair of cylindrical floats having oppositely spiraled vanes thereon, a frame in which the floats are mounted for rotary movement with the axis of rotation of one float at an angle to the axis of rotation of the other float so that the floats will be disposed in diverging relation, a driving connection between the floats by which rotation of one float in one direction can only rotate the other float in the opposite direction, means for anchoring the frame in a body of water, means by which the frame can be adjusted relative to the direction of flow of the water to occupy one position wherein the force of the flowing water will act against the spiral vanes of the floats to rotate the latter in opposed directions, and another position wherein the floats will be so disposed relative to the direction of water flow that the water in acting against the float vanes will tend to rotate the floats in the same direction, whereby said driving connection will lock and thereby prevent rotation of the floats, and means for securing the frame in either position, said adjusting means comprising a drum rotatably mounted on the frame, pulleys rotatably mounted on the frame at opposite sides of the drum, and cables trained about the drum and pulleys and connected to the anchoring means, one of said cables being caused to wind upon the drum and the other to unwind from the drum according as the drum is rotated in one direction or the other and thereby cause the frame to be swung about the anchoring means in one direction or the other.

6. A current motor comprising a pair of cylindrical floats having oppositely spiraled vanes thereon, a frame in which the floats are mounted for rotary movement with the axis of rotation of one float at an angle to the axis of rotation of the other float so that the floats will be disposed in diverging relation, a driving connection between the floats by which rotation of one float in one direction can only rotate the other float in the opposite direction, means for anchoring the frame in a body of water, means by which the frame can be adjusted relative to the direction of flow of the water to occupy one position wherein the force of the flowing water will act against the spiral vanes of the floats to rotate the latter in opposed directions, and another position wherein the floats will be so disposed relative to the direction of water flow that the water in acting against the float vanes will tend to rotate the floats in the same direction, whereby said driving connection will lock and thereby prevent rotation of the floats, and means for securing the frame in either position, said adjusting means comprising a drum rotatably mounted on the frame, pulleys rotatably mounted on the frame at opposite sides of the drum, and cables trained about the drum and pulleys and connected to the anchoring means, one of said cables being caused to wind upon the drum and the other to unwind from the drum according as the drum is rotated in one direction or the other and thereby cause the frame to be swung about the anchoring means in one direction or the other, and said means for securing the frame in either position comprising a toothed wheel fixed to the drum, and a pawl engageable with the teeth of the wheel.

7. A current motor comprising a pair of cylindrical floats having spirally arranged vanes thereon and provided with trunnions at their ends, a frame in which the trunnions are mounted to support the floats in diverging relation to each other for rotary movement, means for anchoring the frame in a body of water to dispose the floats at opposed angles with respect to the direction of flow of the water so that the force of the latter will act against the float vanes to rotate the floats, and means by which the rotary motion of the floats can be utilized to perform useful work comprising a pair of meshing bevel gears fixed to the axes of the floats at their converging ends, an upright shaft journaled in the frame and having a gear meshing with one of the pair of gears, a water pump supported by the frame and having its intake submerged in the water, and a driving connection between said shaft and the pump.

8. A current motor comprising a pair of cylindrical floats having spirally arranged vanes thereon and provided with trunnions at their ends, a frame in which the trunnions are mounted to support the floats in diverging relation to each other for rotary movement, means for anchoring the frame in a body of water to dispose the floats at opposed angles with respect to the direction of flow of the water so that the force of the latter will act against the float vanes to rotate the floats, and means by which the rotary motion of the floats can be utilized to perform useful work, said means including universal joints at one end of the floats and pivoted hangers at the other ends of the floats by which a limited lateral movement of the floats independently of each other in response to wave action, can be effected.

9. A current motor comprising a frame including a transverse member, a longitudinal member extending from the transverse member intermediate its ends, a bracket secured to the free end of the longitudinal member, stub shafts journaled in the bracket in angular relation, and having meshing bevel gears fixed thereto, hangers pivoted to the ends of the transverse member, a pair of cylindrical floats having spiral vanes thereon, trunnions at the ends of the floats, the trunnions at one end of the floats being journaled in the hangers, universal joints connecting the trunnions at the opposite end of the floats to said stub shaft, means for anchoring the frame in a body of water, and power transferring means operatively connected to said gears.

10. A current motor comprising a float carrying frame including a transverse member and a longitudinal member extending from the transverse member intermediate its ends, means for anchoring the frame in a body of water, a drum rotatably mounted on the longitudinal member, pulleys rotatably mounted on the transverse member at opposite sides of the longitudinal member, cables trained about the pulleys and about the drum in opposed directions, and connected at one end to the anchoring means so that by rotating the drum in one direction or the other, one cable will be wound upon the drum and the other cable unwound from the drum to accordingly cause the frame to swing about the anchoring means in one direction or the other, means for rotating the drum, and means for locking the drum against rotation.

11. A current motor comprising a float carrying frame including a transverse member and a longitudinal member extending from the transverse member intermediate its ends, means for anchoring the frame in a body of water, a drum rotatably mounted on the longitudinal member, pulleys rotatably mounted on the transverse member at opposite sides of the longitudinal member, cables trained about the pulleys and about the drum in opposed directions, and connected at one end to the anchoring means so that by rotating the drum in one direction or the other, one cable will be wound upon the drum and the other cable unwound from the drum to accordingly cause the frame to swing about the anchoring means in one direction or the other, means for rotating the drum, and means for locking the drum against rotation, comprising a toothed wheel fixed to the drum, and a pawl mounted on the frame and engageable with the teeth of the wheel.

12. A current motor comprising a float carrying frame, means for anchoring the frame in a body of water, a drum rotatably mounted on the frame, pulleys rotatably mounted on the frame at opposite sides of the drum, and cables trained about the pulleys and about the drum and connected to the anchoring means so that by rotating the drum in one direction or the other, a pulling force will be exerted on one cable or the other to effect swinging of the frame about the anchoring means in one direction or the other.

13. A current motor comprising a float carrying frame, means for anchoring the frame in a body of water, a drum rotatably mounted on the frame, pulleys rotatably mounted on the frame at opposite sides of the drum, cables trained about the pulleys and about the drum in opposed directions and connected to the anchoring means so that by rotating the drum in one direction or the other, one cable will be wound upon the drum and the other cable unwound from the drum to accordingly cause the frame to swing about the anchoring means in one direction or the other, means for rotating the drum, and means for locking the drum against rotation.

Signed at San Diego in the county of San Diego and State of California this 23rd day of June A. D. 1928.

WILLIAM H. CROFTON.